United States Patent
Hu et al.

(10) Patent No.: US 12,060,274 B2
(45) Date of Patent: Aug. 13, 2024

(54) GRAPHITE MATERIALS, AND METHODS FOR FABRICATING AND USE THEREOF

(71) Applicants: UNIVERSITY OF MARYLAND, COLLEGE PARK, College Park, MD (US); TRINITY RAIL GROUP, LLC, Dallas, TX (US)

(72) Inventors: Liangbing Hu, Potomac, MD (US); Yubing Zhou, College Park, MD (US); Chaoji Chen, Hyattsville, MD (US); Teng Li, Potomac, MD (US); Robert W. Foster, Dallas, TX (US); Dapeng Liu, College Park, MD (US)

(73) Assignees: University of Maryland, College Park, College Park, MD (US); Trinity Rail Group, LLC, Dallas, TX (US)

( * ) Notice: Subject to any disclaimer, the term of this patent is extended or adjusted under 35 U.S.C. 154(b) by 716 days.

(21) Appl. No.: 16/967,165

(22) PCT Filed: Feb. 8, 2019

(86) PCT No.: PCT/US2019/017241
§ 371 (c)(1),
(2) Date: Aug. 4, 2020

(87) PCT Pub. No.: WO2019/157301
PCT Pub. Date: Aug. 15, 2019

(65) Prior Publication Data
US 2021/0078864 A1    Mar. 18, 2021

Related U.S. Application Data

(60) Provisional application No. 62/628,785, filed on Feb. 9, 2018.

(51) Int. Cl.
C01B 32/21    (2017.01)
B82Y 30/00    (2011.01)
(Continued)

(52) U.S. Cl.
CPC .............. C01B 32/21 (2017.08); C08K 3/046 (2017.05); C08L 1/02 (2013.01); D21H 13/50 (2013.01);
(Continued)

(58) Field of Classification Search
CPC ... C01B 32/21; C01B 2204/04; C01B 32/196; C08K 3/046; C08K 9/08; C08K 3/04;
(Continued)

(56) References Cited

U.S. PATENT DOCUMENTS

| 8,992,728 B2 | 3/2015 | Isogai et al. |
| 2016/0168272 A1* | 6/2016 | Retsina ................. C08B 15/08 162/9 |

(Continued)

FOREIGN PATENT DOCUMENTS

| WO | 2013/076372 A1 | 5/2013 | |
| WO | WO 2013/076372 | * 5/2013 | .............. C08K 3/04 |

OTHER PUBLICATIONS

Zhu, et al., Self-Assembled TEMPO Cellulose Nanofibers: Graphene Oxide-Based Biohybrids for Water Purificaiton, ACS Appl. Mater. Interfaces 2017; 9: 21048-21058 (Year: 2017).*

(Continued)

*Primary Examiner* — Daniel C. McCracken
(74) *Attorney, Agent, or Firm* — RowanTree Law Group, PLLC; Frederick F. Rosenberger

(57) ABSTRACT

Cellulose nanofibers (CNF) act as a dispersing agent to directly exfoliate graphite in an aqueous solution using sonication. The resulting suspension has graphite flakes, each having 2-20 monolayers, a relatively large lateral dimension, and a plurality of CNF decorating its surfaces and edges. The dispersing effect of the CNF allows the graphite-CNF suspension to be stored without degradation until desired use. The graphite-CNF suspension can be used (Continued)

to form various composite structures, such as by spraying, coating, pouring, extruding, or printing the suspension, and then drying the suspension. The resulting composite structures have improved tensile strength and toughness due to hydrogen bond interactions between the CNF and graphite.

16 Claims, 5 Drawing Sheets

(51) Int. Cl.
| | |
|---|---|
| *B82Y 40/00* | (2011.01) |
| *C08K 3/04* | (2006.01) |
| *C08L 1/02* | (2006.01) |
| *D21H 13/50* | (2006.01) |
| *D21H 15/12* | (2006.01) |

(52) U.S. Cl.
CPC .............. *D21H 15/12* (2013.01); *B82Y 30/00* (2013.01); *B82Y 40/00* (2013.01); *C01P 2004/16* (2013.01); *C01P 2004/24* (2013.01); *C01P 2006/16* (2013.01); *C08L 2205/16* (2013.01)

(58) Field of Classification Search
CPC ....... C08L 1/02; C08L 2205/16; D21H 13/50; D21H 15/12; D21H 11/18; D21H 15/02; D21H 15/10; B82Y 30/00; B82Y 40/00; C01P 2004/16; C01P 2004/24; C01P 2006/16; Y02P 20/582; C23C 24/00
See application file for complete search history.

(56) References Cited

U.S. PATENT DOCUMENTS

| | | |
|---|---|---|
| 2017/0200943 A1 | 7/2017 | Kawakami |
| 2018/0053929 A1 | 2/2018 | Yamashita et al. |
| 2018/0151885 A1 | 5/2018 | Bosnyak et al. |

OTHER PUBLICATIONS

International Search Report and Written Opinion, mailed Jun. 3, 2019, in International Application No. PCT/US2019/017241. (12 pages).
Chen et al., "Mechanically Strong, Electrically Conductive, and Biocompatible Graphene Paper," *Advanced Materials*, 2008, 20: pp. 3557-3561. (5 pages).
Klemm et al., "Nanocelluloses: A New Family of Nature-Based Materials," *Angew. Chem. Int. Ed.*, 2011, 50: pp. 5438-5466. (29 pages).
Li et al., "Hybridizing wood cellulose and graphene oxide toward high-performance fibers," *NPG Asia Materials*, 2015, 7:e150. (10 pages).
Mao et al., "Synthetic nacre by predesigned matrix-directed mineralization," *Science*, Oct. 2016, 354(6308): pp. 107-110. (4 pages).
Meyers et al., "Structural Biological Materials: Critical Mechanics-Materials Connections," *Science*, Feb. 2013, 339: pp. 773-779. (7 pages).
Munch et al., "Tough, Bio-Inspired Hybrid Materials," *Science*, Dec. 2008, 322: pp. 1516-1520. (5 pages).
Nakagaito et al., "The effect of morphological changes from pulp fiber towards nano-scale fibrillated cellulose on the mechanical properties of high-strength plant fiber based composites," *Applied Physics A: Materials Science & Processing*, 2004, 78: pp. 547-552. (6 pages).
Tang et al., "Nanostructured artificial nacre," *Nature Materials*, Jun. 2003, 2: pp. 413-180 (7 pages).
Wan et al., "Use of Synergistic Interactions to Fabricate Strong, Tough, and Conductive Artificial Nacre Based on Graphene Oxide and Chitosan," *ACS Nano*, 2015, 9(10): pp. 9830-9836. (7 pages).
Xiong et al., "Ultrarobust Transparent Cellulose Nanocrystal-Graphene Membranes with High Electrical Conductivity," *Advanced Materials*, 2016, 28: pp. 1501-1509. (9 pages).
Zhang et al., "Multifunctional Pristine Chemically Modified Graphene Films as Strong as Stainless Steel," *Advanced Materials*, 2015, 27: pp. 6708-6713. (6 pages).
Zhu et al., "Anomalous scaling law of strength and toughness of cellulose nanopaper," *PNAS*, Jul. 2015, 112(29): pp. 8971-8976. (6 pages).

\* cited by examiner

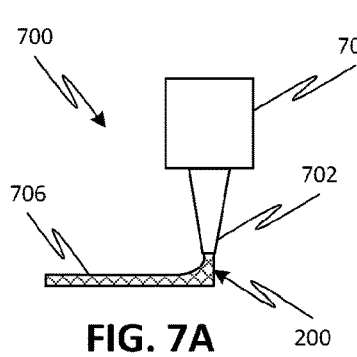
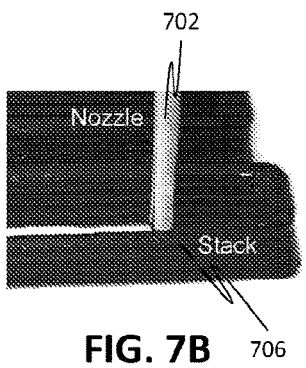
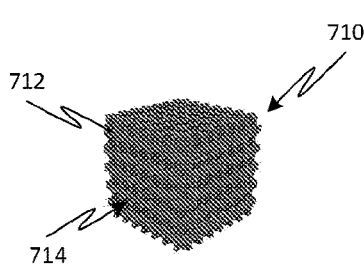
FIG. 7A    FIG. 7B    FIG. 7D
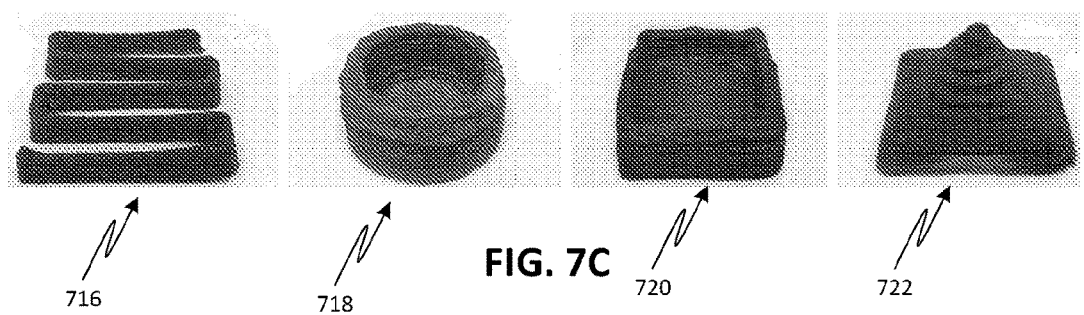
FIG. 7C
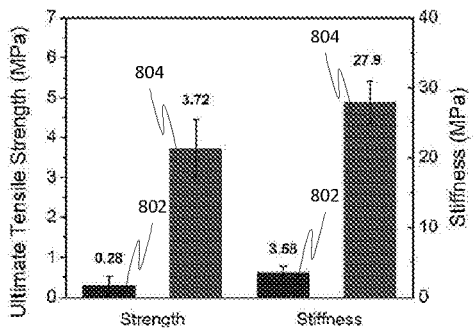
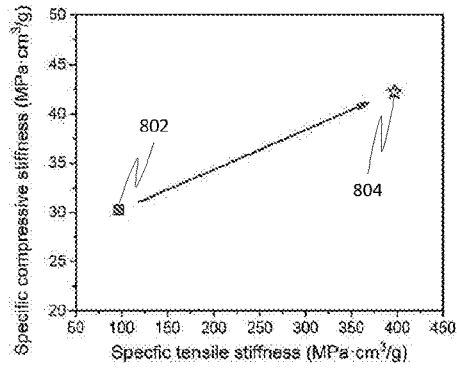
FIG. 8A    FIG. 8B
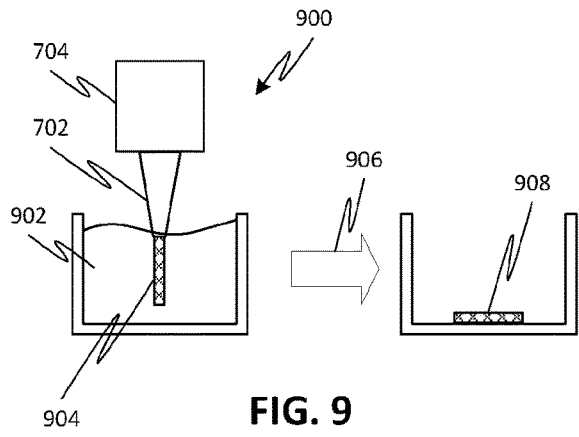
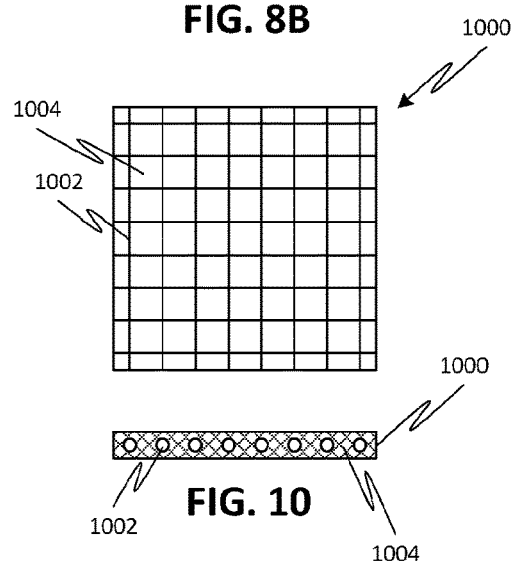
FIG. 9    FIG. 10

GRAPHITE MATERIALS, AND METHODS FOR FABRICATING AND USE THEREOF

CROSS-REFERENCE TO RELATED APPLICATIONS

The present application claims the benefit of U.S. Provisional Application No. 62/628,785, filed Feb. 9, 2018, which is hereby incorporated by reference herein in its entirety.

FIELD

The present disclosure relates generally to composite materials including graphite, and more particularly, to graphite combined with cellulose nanofibers (CNF), as well as composite structures formed from or incorporating graphite-CNF.

SUMMARY

Embodiments of the disclosed subject matter provide a composite structure formed from or incorporating a hybrid material of graphite and nanofibrillated cellulose (CNF) fibrils. The CNF fibrils can be combined with a crystalline graphite starting material (e.g., natural or unmodified graphite powder) in solution (e.g., pure water) and subjected to sonication. The CNF interacts with the graphite to directly exfoliate into few-layer graphite flakes (e.g., 2-20 atomic monolayers), with CNF fibrils attached to surfaces and edges of the graphite flakes. The CNF thus acts as a dispersing agent, and the hybrid material of graphite-CNF can remain in solution as a suspension (or colloid, which terms are used interchangeably herein) for use in building composite structures. For example, the suspension can constitute an ink, slurry, paint, or paste, depending on the final concentration (e.g., 2-30 wt %), and can be stably stored for months (or even years) without degradation or sedimentation.

While prior studies involve the use of graphene (i.e., 1 atomic monolayer) or graphene oxide, which require harsh chemical treatments and/or intensive mechanical exfoliation that can lead to defects and limited lateral size, embodiments of the disclosed subject matter use graphite and rely on techniques that are mild (i.e., at room temperature, e.g., ≤30° C.), green (i.e., without surfactant or harsh chemicals), cost-effective (i.e., employing relatively cheap starting materials), and readily scalable to commercial manufacturing. Moreover, embodiments of the disclosed subject matter offer a suspension of relatively high solid concentration (e.g., ≥20 wt %) that can be used to form composite structures, where the graphite flakes have relatively large lateral size (e.g., greater than 1 µm, for example, ~11 µm±3.5 µm) with limited defects.

Such suspensions can be used to form 1-D (e.g., wire), 2-D (e.g., sheet), or 3-D (e.g., pyramid) composite structures by any fabrication method, including but not limited to spraying, slurry coating, brush coating, blade coating, pouring, extruding, and three-dimensional printing. In some embodiments, the graphite-CNF suspension can be used to directly form a composite structure, for example, by applying the suspension and then removing the solvent (e.g., by drying). In other embodiments, the graphite-CNF suspension can be used as part of a composite structure, for example, by acting as a filler in other structural materials, by forming an internal structure supporting another material (e.g., with a polymer fully or partially encapsulating the graphite-CNF structure), or by forming an external structure that fully or partially encapsulates another material (e.g., with the graphite-CNF forming an external layer over a supporting mesh).

Composite structures formed with or incorporating the disclosed graphite-CNF suspensions can have superior mechanical properties. For example, graphite-CNF structures can have both improved tensile strength (e.g., ~1 GPa, or a specific tensile strength of 794 MPa cm$^3$/g) and improved toughness (e.g., 20-30 MJ/m$^3$). The graphite-CNF composite structures can be recycled by simply dissolving the structure in solvent, thereby reconstituting the original graphite-CNF suspension which can be reused to form additional composite structures. In some embodiments, the weatherability of graphite-CNF structures can be improved by coating external surfaces thereof with and/or incorporating therein an appropriate environmental protection film (e.g., paint or polymer coating).

In some embodiments, pores can be introduced between graphite flakes of the graphite-CNF structure during the fabrication process. The resulting porous graphite-CNF structure may have a substantially reduced density (e.g., ≤0.1 g/cm$^3$), and can replace non-recyclable polymer materials in certain applications, such as but not limited to packaging. For example, pore-formers can be integrated into the suspension, and then removed (e.g., by sublimation or dissolution) after drying of the graphite-CNF structure, thereby leaving behind pores in the final graphite-CNF structure. In some embodiments, the pores formed in the graphite-CNF structure can be nanopores (e.g., having a dimension ≤1 µm) and the resulting graphite-CNF structure may be considered a foam.

In one or more embodiments, a composite material comprises a plurality of graphite flakes. Each graphite flake has a plurality of fibrils attached to respective surfaces of the graphite flake, and the fibrils are cellulose nanofibers (CNF).

In one or more embodiments, a method comprises forming a composite material by using a suspension or colloid comprising a plurality of graphite flakes. Each graphite flake has a plurality of fibrils attached to respective surfaces of the graphite flake, and the fibrils are cellulose nanofibers (CNF).

In one or more embodiments, a colloid or suspension comprises a plurality of graphite flakes and a solvent in which the plurality of graphite flakes is disposed. Each graphite flake has a plurality of fibrils attached to respective surfaces of the graphite flake. The fibrils are cellulose nanofibers (CNF) and act as a dispersing agent with respect to the graphite flakes in the solvent.

Objects and advantages of embodiments of the disclosed subject matter will become apparent from the following description when considered in conjunction with the accompanying drawings.

BRIEF DESCRIPTION OF DRAWINGS

Embodiments will hereinafter be described with reference to the accompanying drawings, which have not necessarily been drawn to scale. Where applicable, some elements may be simplified, exaggerated, or otherwise not illustrated in order to assist in the illustration and description of underlying features. Throughout the figures, like reference numerals denote like elements.

FIG. 7A illustrates an exemplary process for forming a graphite-CNF structure by printing, according to one or more embodiments of the disclosed subject matter.

FIG. 7B is an image of in-process printing of a graphite-CNF structure.

FIG. 7C shows images of various graphite-CNF structures formed by printing.

FIG. 7D is a simplified schematic of a microscopic structure of a fabricated porous graphite-CNF structure (i.e., graphite-CNF foam).

FIG. 8A is a graph comparing ultimate tensile strength and stiffness for a fabricated graphite-CNF foam to that of polystyrene (PS) foam.

FIG. 8B is a graph comparing specific tensile stiffness and specific compression stiffness for a fabricated graphite-CNF foam to that of PS foam.

FIG. 9 illustrates another exemplary process for forming a graphite-CNF structure by printing, according to one or more embodiments of the disclosed subject matter.

FIG. 10 illustrates simplified side and cross-sectional views of a composite structure formed with graphite-CNF, according to one or more embodiments of the disclosed subject matter.

DETAILED DESCRIPTION

A composite structure can be formed from hybrid material building blocks comprised of graphite flakes with fibrils of cellulose nanofibers (CNF) attached to surfaces of the graphite flakes. As used herein composite structure (or material) can refer to the final structure formed by or incorporating the graphite-CNF hybrid material, as well as any intermediates formed by the graphite-CNF hybrid material, for example, the initial graphite-CNF suspension in a storage container, a dispensed portion of the graphite-CNF suspension (e.g., a layer in a 3-D printed stack before full drying), or a partially-dried graphite-CNF suspension (e.g., a stack of layers prior to or during hot pressing).

Figure 1:
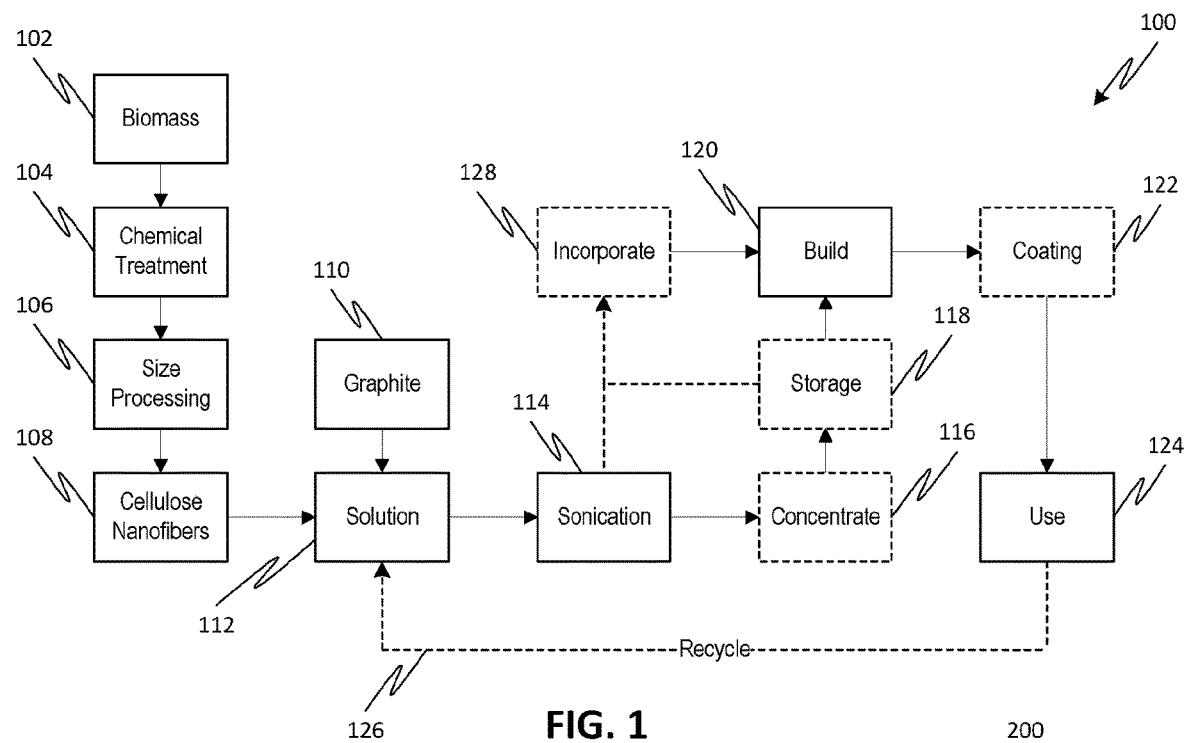
FIG. 1 is a generalized process flow diagram illustrating aspects of fabrication of a composite material using the combination of graphite and cellulose nanofibers (CNF), according to one or more embodiments of the disclosed subject matter.

FIG. 1 is a simplified flow diagram for a generalized process 100 of forming the graphite-CNF hybrid material and using the graphite-CNF to build composite structures. The process 100 includes providing the CNF fibrils, which may begin with a starting supply of biomass 102. The biomass can be any type of cellulosic or wood pulp, such as a hardwood or softwood. The biomass can be subject to a chemical treatment at 104. For example, the chemical treatment 104 can comprise (2,2,6,6-tetramethylpiperidin-1-yl) oxidanyl (TEMPO) oxidation. At 106, the treated biomass can be subject to size processing to reduce or select for a size of the fibrils. For example, the treated biomass can be processed such that each fibril in the final product of CNF at 108 has a diameter ≤5 nm and a length ≤600 nm. In some embodiments, the final CNF product at 108 may be disposed in solution, such that the final CNF product is considered a hydrogel. The resulting fibrils can have surface charged groups and/or hydrophilic/hydrophobic functional groups.

In a fabricated example, a total of 5 g of kraft-bleached hardwood (*Eucalyptus*) pulp was suspended in 250 mL deionized water containing 0.5 mmol TEMPO and 5 mmol NaBr. The TEMPO-mediated oxidation was initiated with the addition of 25 mmol NaClO. The pH was maintained at 10.0 with 1 mol/L NaOH solution, and the process was maintained under stirring for about 2-3 hours. The resulting pulp was washed by filtration and stored at 4° C. for further processing. Size processing was performed via mechanical treatment of the TEMPO-oxidized fibrils in a microfluidizer at different pressures, which further reduces the fibril diameter.

The process 100 includes providing native graphite at 110. As used herein, native graphite refers to naturally-occurring crystalline graphite or crystalline graphite that has otherwise not been processed or subject to harsh chemical treatments, unlike prior studies that form graphene or graphene oxide. The native graphite 110 can be added with the CNF to an aqueous solution at 112, which is then subject to sonication at 114. For example, the solution at 112 can be substantially pure water (e.g., distilled or deionized water).

The solid ratio of graphite to CNF within the solution can be in the range of 1:2 to 2:1, for example, approximately 1:1.

Figure 2A:
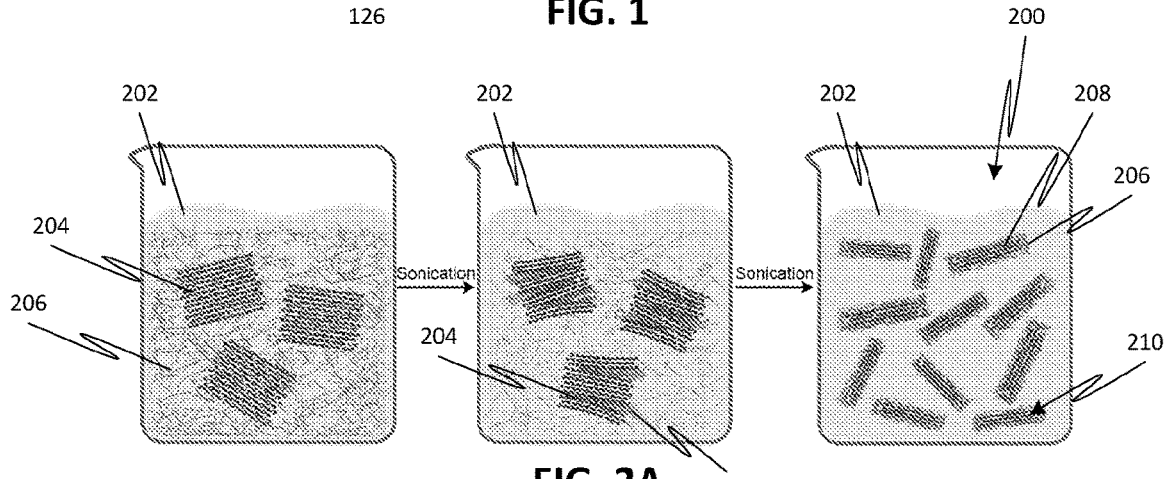
FIG. 2A illustrates an exemplary process for forming a suspension of graphite-CNF, according to one or more embodiments of the disclosed subject matter.
Figure 2B:
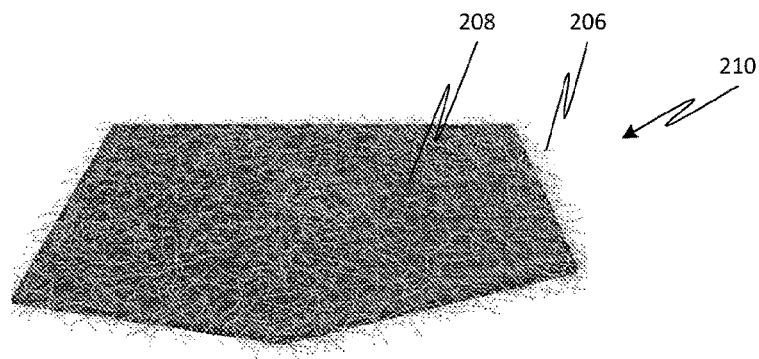
FIG. 2B is a close-up view of an individual graphite flake decorated with CNF, according to one or more embodiments of the disclosed subject matter.
Figure 3A:
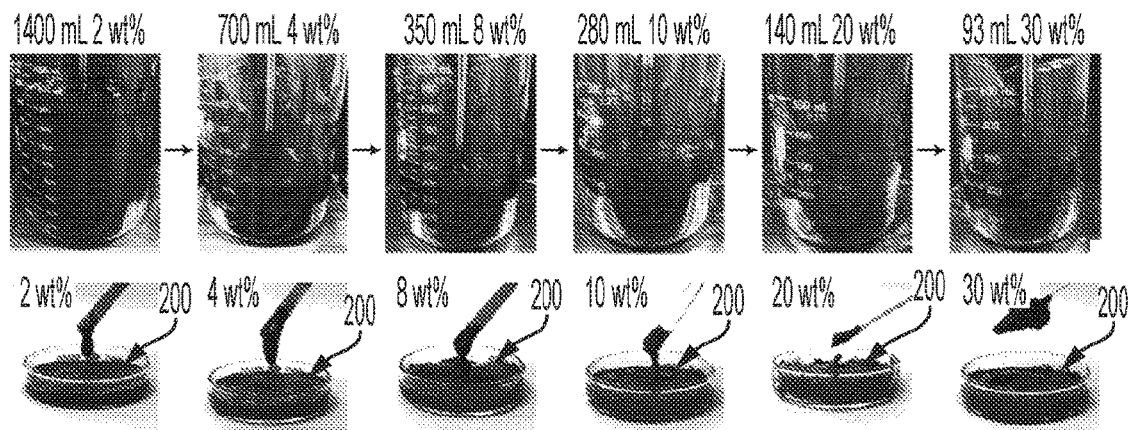
FIG. 3A are images of fabricated graphite-CNF suspensions at different concentrations, according to one or more embodiments of the disclosed subject matter.
Figure 3B:
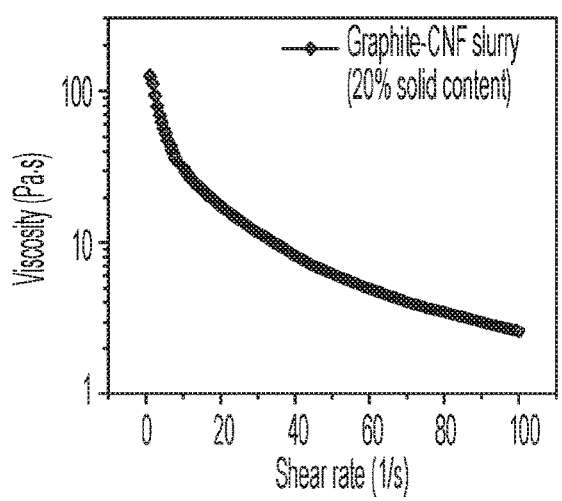
FIG. 3B is a graph of viscosity versus shear rate for a fabricated graphite-CNF suspension having a concentration of 20 wt %.
Figure 3C:
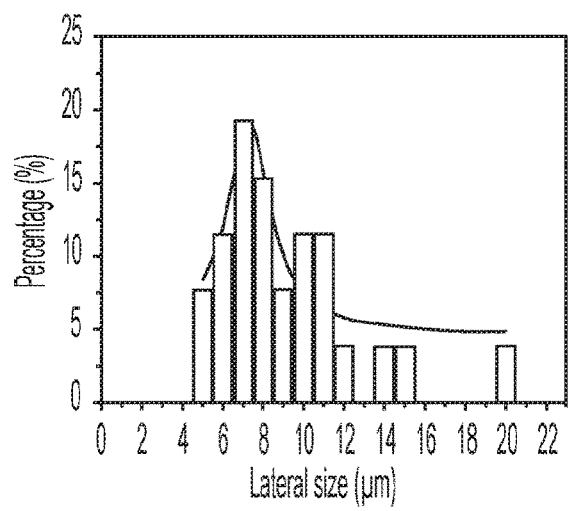
FIG. 3C is a distribution graph of lateral size of graphite flakes in a fabricated graphite-CNF suspension.

Surfaces of the native graphite are hydrophobic, while the edges of the native graphite are terminated with hydrogen atoms as well as a few hydroxy and carboxyl groups. The CNF contains hydrophobic C—H moieties, which interact with the hydrophobic surfaces of the native graphite. The CNF also contains hydrophilic hydroxyl functional groups that form hydrogen bonds with the edges of the graphite. As shown in FIG. 2A, the CNF 206 thus attaches to surfaces of the native graphite 204 in solution 202 and acts as a dispersant to directly exfoliate the graphite 204 (assisted by sonication) into individual graphite flakes 208 without further surface-active compounds. The sonication treatment helps accelerate the insertion of CNF 206 into graphite 204 and promote the exfoliation of the graphite 204 into smaller/thinner flakes 208. Each graphite flake 208 is constituted of a few atomic monolayers (i.e., 2-20 atomic monolayers, inclusive) and has a lateral dimension (i.e., a largest width in a plane perpendicular to a stacking direction of the atomic monolayers) greater than 1 μm. In some embodiments, most, or at least a majority, of the graphite flakes 208 are constituted of 3-5 atomic monolayers, inclusive, and have respective lateral dimensions greater than or equal to 7.5 μm (e.g., 11±3.5 μm). For example, FIG. 3C illustrates an exemplary size distribution for graphite flakes in a fabricated example. The CNF fibrils 206 are attached to surfaces and edges of the individual graphite flakes 208 to form a hybrid graphite-CNF hybrid building block 210 (as shown in FIGS. 2A-2B) in solution.

In a fabricated example, native graphite powder was mixed with 2 wt % CNF solution to have a solid mass ratio of 1:1. The dispersion process included a two-step sonification, with the first step being performed using an ultrasonic liquid processor inserted into the solution followed by bath sonication. The immersion sonication was performed for 5 minutes, and the bath sonication was performed for 15 minutes. After sonication, graphite flakes were well dispersed in solution, with CNF attached to surfaces of the graphite flakes. The obtained solution with graphite-CNF therein was degassed under vacuum to remove any bubbles in preparation for further use or concentration.

Returning to FIG. 1, the solution with graphite-CNF resulting from the sonication can optionally be concentrated at 116 in order to achieve different viscosities. For example, the concentration can be achieved by removing solvent from the solution, for example, by solvent exchange, partial drying, and/or evaporation. Absent the CNF fibrils, there is a strong inclination for few-layer graphite flakes 206 to undergo π-π stacking, which reduces dispersion stability and requires vast amounts of solvent (e.g., 1000× solid weight) in order to achieve a homogenous and stable dispersion. Concentration could thus cause the exfoliated graphite flakes 206 to reassemble. However, interactions between the CNF fibrils 206 of the building blocks 210 help prevent such re-stacking of graphite flakes 208 due to the electrostatic repulsive forces generated by the charged NFC carboxyl groups (having a Zeta potential of −52.9 mV), thereby allowing for higher solid concentrations of graphite in solution (e.g., up to 30 wt %) than has otherwise been possible. The solution of graphite-CNF particles 210 can thus be considered a suspension 200 or colloid, which terms are used interchangeably herein.

Figure 3D:
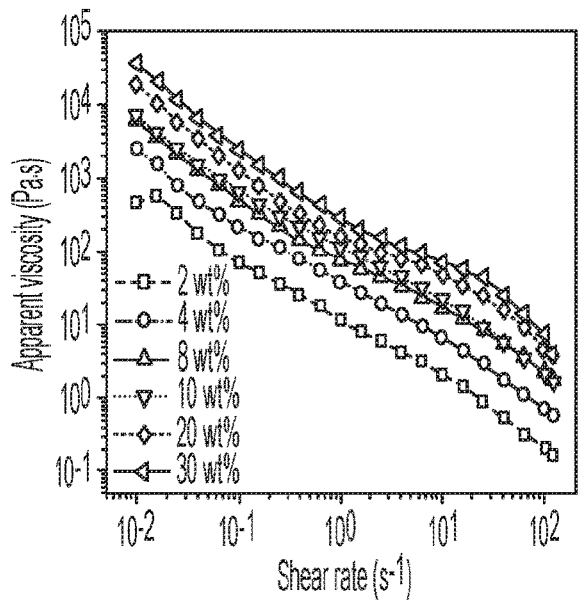
FIG. 3D is a graph of apparent viscosity versus shear rate for fabricated graphite-CNF suspensions at different concentrations.

In fabricated examples, the graphite-CNF suspension is concentrated by heating at 110° C., while stirring to ensure uniformity, to achieve a particular final concentration with corresponding viscosity. FIG. 3A shows the results of such fabricated examples. The initial as-prepared solution with graphite-CNF is a fluid with a solid concentration of 2 wt %. Increasingly viscous solutions having concentrations up to 30 wt % were fabricated by evaporating corresponding volumes of water. FIG. 3B illustrates the rheological properties of 20 wt % graphite-CNF solution, which is similar to that of 4 wt % CNF solution without any graphite. FIG. 3D shows the apparent viscosity as a function of shear rate for the solutions with graphite-CNF at different concentrations. As is apparent from the figures, the apparent viscosity of graphite-CNF suspension is increased when the solid concentration of the graphite-CNF slurry is increased. The concentrations and corresponding rheological behaviors of the graphite-CNF solutions can thus be tailored to a particular build process (e.g., coating, spraying, painting, printing, or extruding). Based on the concentration and resulting viscosity, the graphite-CNF suspension can be considered an ink (least viscous), a slurry, a paint, or a paste (most viscous).

Figure 3E:
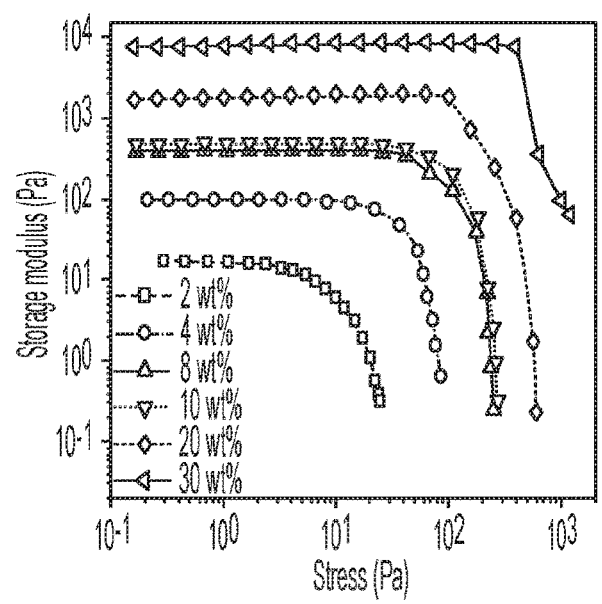
FIG. 3E is a graph of storage modulus versus oscillation stress for fabricated graphite-CNF suspensions at different concentrations.
Figure 3F:
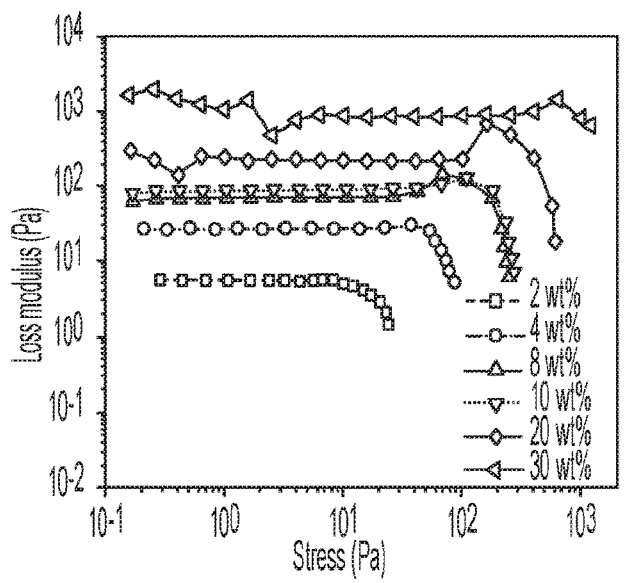
FIG. 3F is a graph of loss modulus versus oscillation stress for fabricated graphite-CNF suspensions at different concentrations.

FIGS. 3E-3F compare the storage G' (elastic) and loss G" (viscous) moduli of graphite-CNF suspensions as a function of shear stress with different solid concentrations. The storage and loss moduli reflect the elastic and viscous properties of the prepared graphite-CNF suspensions. As suggested by the figures, the storage modulus is higher than the loss modulus in a plateau region, indicating that the suspension is relatively stiff and exhibits a solid-like response. As shown in FIG. 3E, the plateau modulus of graphite-CNF suspensions having concentration ≥4 wt % is approximately $10^2$ Pa at shear stresses ranging from $10^1$~$10^2$ Pa. In general, the storage modulus G' should be larger than $10^3$ Pa at the shear stress of 1 Pa to achieve a printable material. However, in the fabricated examples, even though the storage module G' of the 8 wt % graphite-CNF suspension is less than $10^3$ Pa at 1 Pa shear stress, the strong hydrogen bonding among graphite, CNF and solvent (e.g., water) maintains shape while the suspension is extruded from the printhead needle, thereby enabling the suspension to be printed.

Returning to FIG. 1, the process 100 can optionally include storing the graphite-CNF suspension at 118. The graphite-CNF suspension, whether directly from sonication 114 without concentration or after concentration 116, can be stored in a sealed container (e.g., bottle) for an extended period of time without degradation or sedimentation due to the interaction between the CNF fibrils. Indeed, the presence of the charged carboxyl groups of the CNF stably maintains the hybrid graphite-CNF 210 in solution without sedimentation for at least six months and potentially indefinitely. Alternatively or additionally, the optional storage 118 can include adding a stabilizer to the suspension to further prevent degradation or sedimentation. Such stabilizers can include, but are not limited to, benzene phosphonous acid compounds.

The process 100 can include a build step 120 using the graphite-CNF suspension, whether freshly resulting from sonication 114, concentrated at 116, or stored at 118. The building 120 can use the graphite-CNF suspension to form a composite structure, either comprising the graphite-CNF alone or in combination with other materials. For example, the building 120 can include forming a layer or structure from the graphite-CNF suspension on a support structure provide by another material. Such forming can include spraying, slurry coating, brush coating, blade coating, pouring, extruding, three-dimensional printing, or any other method of applying a suspension or colloid.

The formed layer or structure can then have the solvent removed therefrom, for example, by evaporation (e.g., drying) or sublimation (e.g., freeze-drying), so as to form a unitary structure from the graphite-CNF building blocks 210. As the solvent leaves the suspension, the mobility of the graphite flakes 208 is strongly limited by hydrogen bonding with the surrounding CNF 206 network, where some of the fibrils 206 on a particular graphite flake 208 become attached to adjacent graphite flakes 208, leading to a dense structure of graphite-CNF building blocks 210. In some embodiments, the resulting graphite-CNF structure can be integrated with the underlying support structure (e.g., mesh) or can be removed from the underlying support structure (e.g., glass substrate).

Figure 4A:
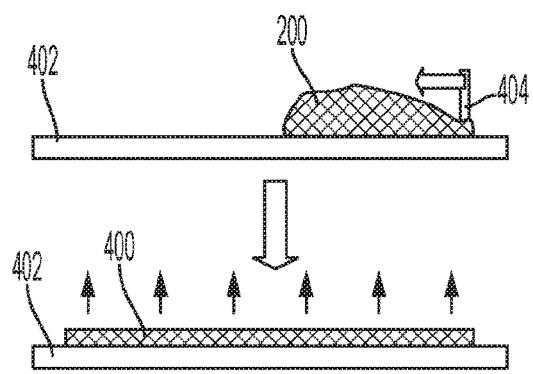
FIG. 4A illustrates an exemplary process for forming a graphite-CNF layer on a substrate, according to one or more embodiments of the disclosed subject matter.
Figure 4B:
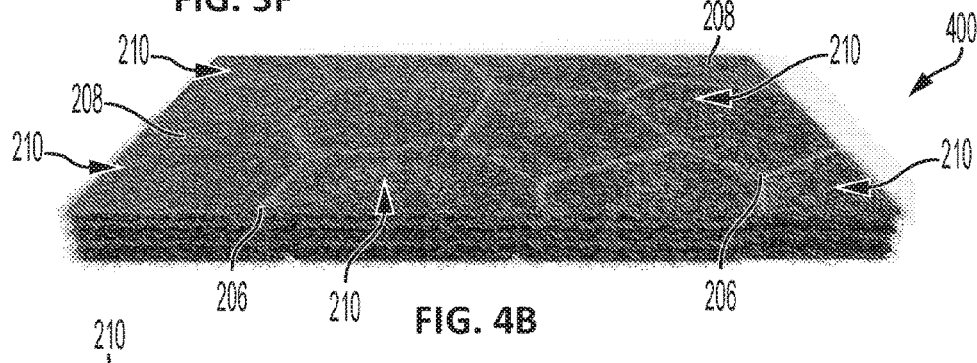
FIG. 4B illustrates a composite two-dimensional layered structure formed by a layer of graphite-CNF, according to one or more embodiments of the disclosed subject matter.

FIG. 4A illustrates aspects of an exemplary build process 120 employing a cast drying technique. The graphite-CNF suspension 200 is first poured on a substrate 402 (e.g., glass substrate) and a blade 404 (e.g., doctor blade) is used to spread the suspension 200 in a uniform thickness across the surface of the substrate 402. Subsequent evaporation of the solvent within the suspension 200 can yield a composite structure composed substantially of the graphite-CNF flakes 210 joined together in a layered assembly 400, as shown in FIG. 4B. Although the substrate 402 is illustrated as flat in FIG. 4A, embodiments of the disclosed subject matter are not limited to flat substrates and other shapes or non-flat geometries are also possible.

The graphite-CNF hybrid structure has an extensive hydrogen bonding network provided by the CNF matrix. Due to its flexible nature, CNF fibrils 206 are able to fill in the spatial gaps between the graphite flakes 208 during the build process 120 of the graphite-CNF composite. In addition, due to the hydrogen bonding sites of CNF fibrils 206, they are able to connect the edges of many graphite flakes 208 despite the relatively sparse distribution of hydroxy groups. As a result, a massive and stable hydrogen bonding network forms during the build process 120, thereby allowing the composite material to enjoy enhanced mechanical properties.

Figure 4C:
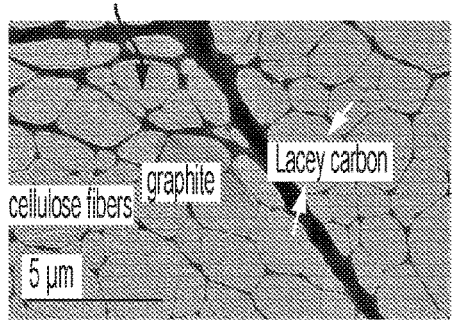
FIG. 4C is a microscope image of an external surface of a fabricated graphite-CNF layer.
Figure 4D:
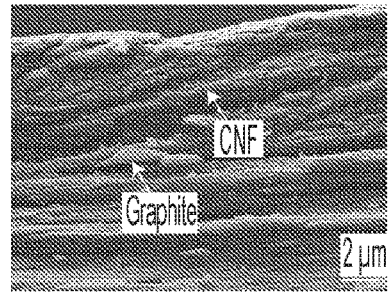
FIG. 4D is a scanning electron microscope (SEM) image showing a cross-sectional view of a fabricated graphite-CNF layer.

In fabricated examples, cast drying of graphite-CNF suspensions at a constant temperature and humidity condition yielded a compact film with controlled size, shape, and thickness (which is dependent on the amount of suspension as well as the surface area of substrate). After the solvent-loss, graphite-CNF films were formed and were easily peeled off from the glass substrates into freestanding states. FIGS. 4C-D are magnified images of the surface and cross-section of a fabricated graphite-CNF film, and illustrate the interaction between CNF fibrils 206 and graphite flakes 208 as building blocks 210. FIG. 3C is a histogram of the lateral size distribution for individual graphite flakes 208 in the fabricated graphite-CNF film (i.e., after drying).

Figure 5A:
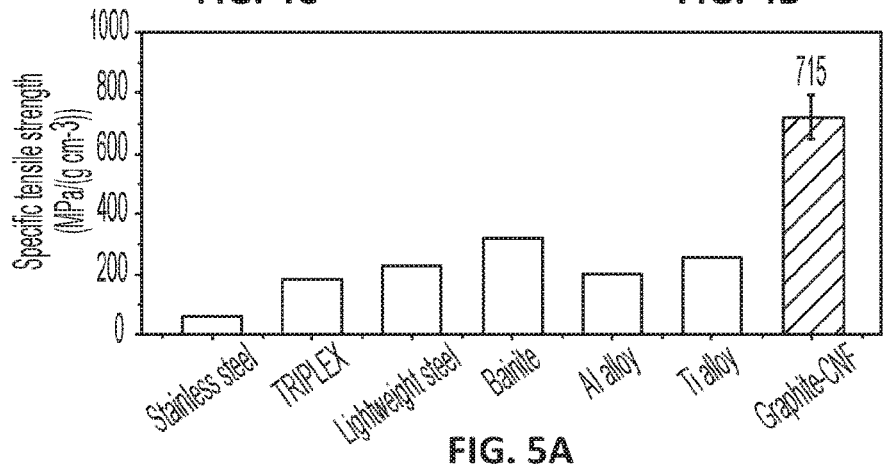
FIG. 5A is a graph comparing specific tensile strength for a fabricated graphite-CNF structure to that of other structural materials.
Figure 5B:
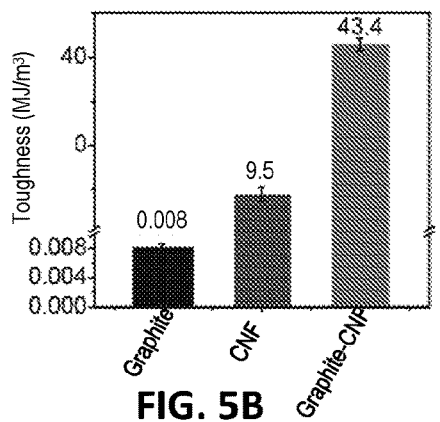
FIG. 5B is a graph comparing toughness for a fabricated graphite-CNF structure to that of structures formed from graphite and CNF individually.
Figure 5C:
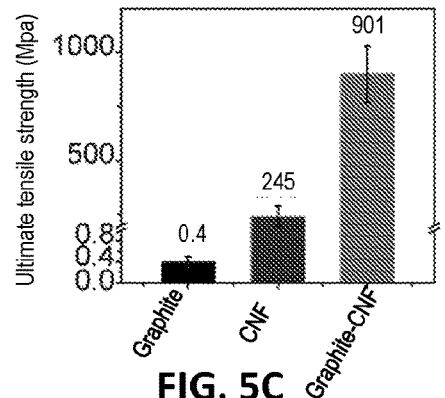
FIG. 5C is a graph comparing ultimate tensile strength for a fabricated graphite-CNF structure to that of structures formed from graphite and CNF individually.

In a particular example, a 120 cm×30 cm graphite-CNF film was fabricated and exhibited high flexibility (being readily foldable to have a radius of ~2 mm without breakage) and isotropic mechanical properties. The synergistic interaction between the graphite flakes and the CNF fibrils can provide a composite structure that enjoys improved mechanical properties over other structural materials. For example, FIG. 5A compares the specific tensile strength of a fabricated graphite-CNF film (i.e., 2 mm×30 mm test sample) to that of other structural material. Moreover, the toughness and tensile strength of the graphite-CNF composite can be greater than either material alone, as illustrated in FIGS. 5B-5C. Both the significantly enhanced strength of the graphite-CNF hybrid film and the slightly prolonged fracture strain can be attributed to the stretching of each individual graphite flakes 208 through its hydrogen bonding with CNF matrix 206. In other words, the mechanically rigid graphite flakes 208 are now an active load-bearing agent in the composite structure.

Figure 6A:
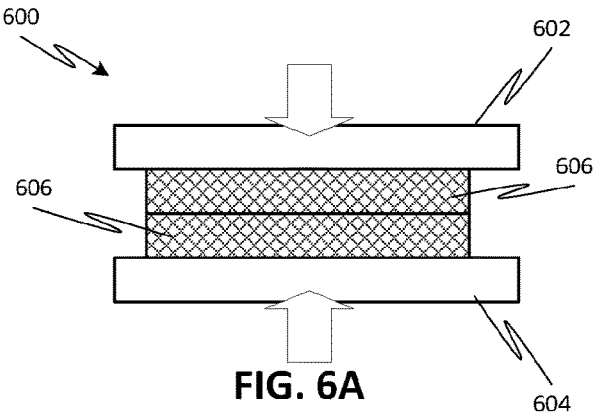
FIG. 6A illustrates an exemplary process for forming a multi-layered structure of graphite-CNF by mechanical pressing, according to one or more embodiments of the disclosed subject matter.
Figure 6B:
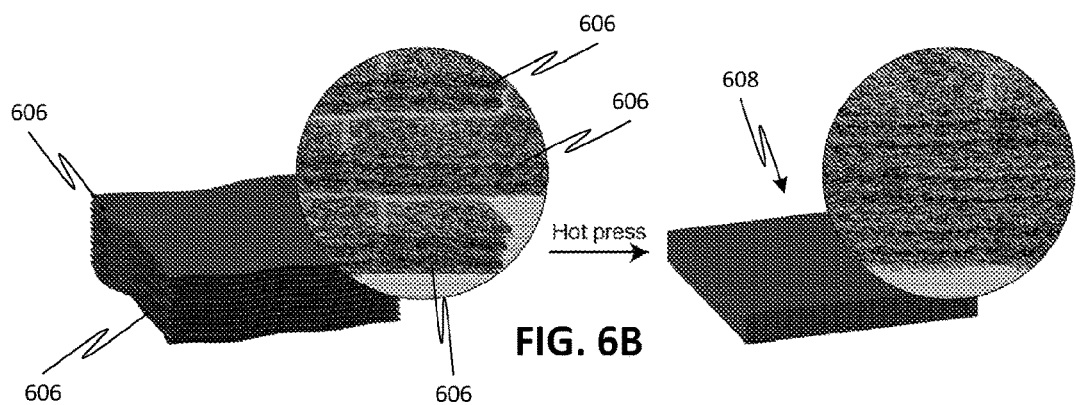
FIG. 6B illustrates the graphite-CNF layers before and after the mechanical pressing of FIG. 6A.

FIGS. 6A-6B illustrate aspects of another exemplary build process 120 employing a pressing technique. Individual graphite-CNF layers 606 may initially be formed in a stack, with one atop the other. For example, the individual layers 606 can be formed by the process of FIG. 4A, with partial or full drying of the previously formed layer before forming the next. The layers 606 may be formed on a substrate 402, and then peeled off for stacking with other graphite-CNF layers 606. Alternatively, a first layer 606 may be formed on a substrate 402, with subsequent layers 606 formed directly atop the first layer while remaining on the substrate 402.

The stack of preliminary graphite-CNF layers 606, with or without supporting substrate 402 (not shown in FIG. 6A), can be disposed between upper 602 and lower 604 platens of a pressing setup 600. The platens 602, 604 can thus apply a compressive force to the stack that forces previously separate stacks 606 together. At a same time, the platens can provide heating (i.e., hot pressing) to remove the remaining solvent from the layers 606. As a result, the hydrogen network of the CNF fibrils can extend between the different layers 606 to form an integrated multi-layer structure 608. Alternatively, the hot pressing may be applied to a single layer 606 to provide drying thereof. In fabricated examples, graphite-CNF layers were formed with thicknesses of 20 to 50 μm and densities of ~1.2 g/cm³ by hot pressing at 60° C. for 24 hours.

FIGS. 7A-7B illustrate aspects of yet another exemplary build process 120 employing a printing technique (e.g., 3-D printing). In the printing setup 700, the graphite-CNF suspension is dispensed (i.e., extruded) via a nozzle 702 of a printer head 704 to form an initial graphite-CNF structure 706 on a substrate, support, or previously formed composite structure (not shown). The viscosity of the suspension is designed such that the suspension 200 can be extruded through the nozzle 702 but is otherwise viscous enough to retain its shape prior to solvent removal. The printer head 704 and/or a support stage over which the graphite-CNF structure 706 can translate (in one-dimension, two-dimensions, or three-dimensions) while the suspension 200 is extruded to pattern a composite structure, as shown in FIG. 7B. In fabricated examples illustrated in FIG. 7C, the printing technique was used to form a serpentine structure 716, a round cup 718, a rectangular box 720, and a pyramid 722. However, other shapes and constructions are also possible according to one or more contemplated embodiments. Once the initial printed structure 706 is completed, the final graphite-CNF structure can be formed by removing the solvent therefrom, for example, by air drying.

In some embodiments, the build process 120 can further include introducing pores 712 into the graphite-CNF structure 710, as illustrated in FIG. 7D. For example, the pores 712 can be formed as nanopores (e.g., having a dimension ≤1 μm) and can be between adjacent flakes in the graphite-CNF matrix 714 of the composite structure 710. The pores can be formed by incorporating a pore-forming material in the graphite-CNF suspension, which material can be removed after forming the graphite-CNF composite. For example, the pore-forming material may constitute the solvent of the graphite-CNF suspension. After forming the initial structure from the graphite-CNF suspension, the structure may be subjected to rapid freezing (e.g., using liquid nitrogen), followed by freeze-drying to remove the solvent. The rapid freezing causes formation of frozen particles in the graphite-CNF matrix of the composite structure, with empty pores being left in place within the matrix after sublimation of the frozen particles by the freeze-drying process. In another example, the pore-forming material may include dissolvable particles, such as salt particles or sugar particles. The particles can thus be removed from the composite structure by dissolving in an appropriate solvent (which solvent does not otherwise dissolve or degrade (or only minimally degrades) the graphite-CNF structure), thereby forming pores from the spaces vacated by the dissolved particles.

In fabricated examples, a graphite-CNF suspension having a concentration of 8 wt % was used to print a graphite-CNF foam (i.e., having a graphite-CNF structure having a plurality of nanopores). The 8 wt % graphite-CNF suspension was continuously extruded from a needle to form a long line-shape structure with a length of 5 cm. As illustrated in FIG. 7B, the graphite-CNF suspension was also extruded from the needle and stacked on substrate layer by layer without structural deformation, owing to the hydrogen bonding among graphite, CNF, and solvent.

In fabricated examples, graphite-CNF suspensions were printed onto a polymer film (polyethylene terephthalate). The printed graphite-CNF suspension was then rapidly frozen by liquid nitrogen. The water in the suspension froze to form uniform nanoparticles of ice under the rapid freezing process. The ice nanoparticles in the frozen suspension were then removed by freeze-drying, leaving behind a uniformly-porous, aerogel-like structure formed of the graphite-CNF (i.e., graphite foam). Magnified images confirmed that the graphite-CNF foam has a continuously disordered network structure. Owing to its highly porous structure, the graphite-CNF foam had an ultra-low density of 0.05 g/cm$^3$. The graphite flakes were uniformly distributed in the network, thereby providing the graphite-CNF foam with substantially isotropic mechanical properties. As shown in FIG. 8A, the graphite-CNF foam (curves 804) exhibited improved tensile properties as compared to a commercially available polystyrene (PS) foam (curves 802), which are typically used for packaging. In particular, the G-CNF foam exhibited an ultimate tensile strength of 3.72 MPa and a tensile stiffness of 27.9 MPa, which are both substantially higher than that of PS foam. For packaging applications, compressive properties may also be important. The graphite-CNF foam showed a higher compressive stiffness (i.e., 2.34 MPa) than that of the commercial plastic PS foam. Due to its low density, the specific tensile stiffness and compressive stiffness of the graphite-CNF foam can be as high as 396.8 MPa·cm$^3$/g and 42.23 MPa·cm$^3$/g, respectively, both of which are substantially higher than the commercial PS foam, as illustrated in FIG. 8B.

FIGS. 9A-9B illustrate aspects of yet another exemplary build process 120 employing a printing technique. In the printing setup 900, the graphite-CNF suspension is dispensed (i.e., extruded) via nozzle 702 of printer head 704 into a second solvent 902, which helps maintain a structure of the dispensed material 904. For example, the dispensed material 904 may be in the form of a thread or wire, with the second solvent 902 helping to prevent collapse of the thread or wire prior to drying. The second solvent 902 can be different from that of the solvent in the graphite-CNF suspension, such that a solvent exchange occurs between the formed suspension 904. For example, the second solvent may be an alcohol such as ethanol, and the solvent of the suspension can be water. The second solvent can then be removed at 906, thereby leaving behind the final composite graphite-CNF structure. For example, the removal 906 can include evaporation of the second solvent, a critical point drying process where the alcohol is replaced by liquid carbon dioxide and transitioned to gas at its critical point, or any other removal process.

As noted above, the build process 120 can include any of coating, spraying, painting, printing, and extruding to form a one-dimensional (e.g., fiber, wire, or thread), two-dimensional (e.g., paper, film, ribbon, or sheet), or three-dimensional (e.g., foam or stacked structure such as a cup, box, or pyramid) composite structure from the graphite-CNF matrix. In some embodiments, the graphite-CNF matrix may be integrated with another material structure. For example, FIG. 10 illustrates top and cross-sectional views of an exemplary configuration for composite structure 1000, where the graphite-CNF matrix 1004 is formed on and encapsulating a supporting mesh 1002 (e.g., polymer, metal, or any other material). Although shown as fully encapsulating the supporting mesh 1002, it is also possible for the graphite-CNF matrix 1004 to only partially encapsulate, i.e., with the mesh 1002 being exposed from one of the surfaces of the graphite-CNF matrix 1004.

Alternatively or additionally, the graphite-CNF matrix may serve as a supporting structure within another material structure. For example, in FIG. 10, the composite structure 1000 can have mesh 1002 be formed of graphite-CNF matrix with a separate material 1004 (e.g., polymer) encapsulating the graphite-CNF mesh 1002. Although shown as fully encapsulating the mesh 1002, it is also possible for the separate material 1004 to only partially encapsulate, i.e., with the graphite-CNF mesh 1002 being exposed from one of the surfaces of the separate material 1004.

Moreover, although FIG. 10 shows a two-dimensional regular rectangular configuration for mesh 1002, other configurations are also possible according to one or more embodiments. For example, mesh 1002 can be replaced by a one-dimensional array of wires or separate beams, by an irregular two-dimensional mesh, by a hexagonal mesh, by support structures radially emanating from a center (e.g., spoke-hub configuration), or in any other configuration.

In some embodiments, the graphite-CNF matrix be integrated directly with a separate material, such that the graphite-CNF structures act as a filler material dispersed within the separate material. For example, in such a configuration, the material may be a polymer, with constituent materials or precursors incorporated within the graphite-CNF suspension, for example, at optional incorporation 128 in FIG. 1. Alternatively or additionally, the optional incorporation at 128 can include a supplemental material (e.g., polymers, nanoparticles (e.g., gold or iron), etc.) but in an amount where the graphite-CNF hybrid material forms the main structure with the supplemental material being incorporated therein (i.e., where the graphite-CNF structures act as the main structure rather than a filler material). In each case, the resulting incorporated suspension can thus be used in subsequent build processes 120 to form the composite structure. Such polymers can be any thermosetting or thermoplastic polymer, such as, but not limited to polyurea and polyvinyl alcohol (PVA). Other exemplary supplemental materials include but are not limited to stabilizers (e.g., benzene phosphonous acid compounds).

Returning to FIG. 1, the process 100 can optionally include coating the composite structure at 122. For example, one or more coatings can be provided over some or all external surfaces of the composite structure including graphite-CNF and can be effective to protect the composite structure from degradation. Such a coating may include a paint (e.g., polyurethane paint), an environmental protection coating (e.g., silicon carbide), or a polymer coating. Such polymers can be any thermosetting or thermoplastic polymers, such as, but not limited to polyurea and polyvinyl alcohol (PVA).

Figure 5D:
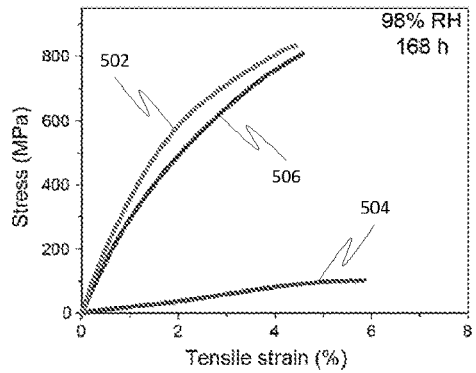
FIG. 5D is a graph of tensile stress-strain curves for coated and uncoated graphite-CNF structures subject to environmental exposure at 98% relative humidity (RH) for 168 hours.
Figure 5E:
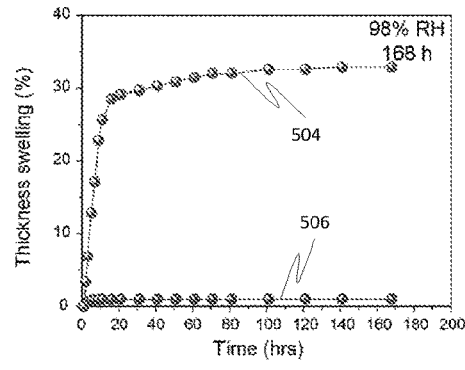
FIG. 5E is a graph of thickness change versus time during the environmental exposure at 98% RH for coated and uncoated graphite-CNF structures.

In fabricated examples, external surfaces of graphite-CNF composite structures were coated with polyurethane paint as a humidity/water barrier. FIGS. 5D-5E compare the effects of environmental exposure (98% relative humidity (RH) for 168 hours) on the graphite-CNF composite structures, with curves 502 representing an unpainted graphite-CNF composite structure prior to any exposure, curves 504 representing the unpainted graphite-CNF composite structure after exposure, and curves 506 representing the painted graphite-CNF composite structure after exposure. The experimental results in FIGS. 5D-5E illustrate stable dimension and mechanical properties for the painted graphite-CNF composites, suggesting that the stability of the graphite-CNF composites against humidity/water can be substantially improved by a surface coating.

Alternatively or additionally, the optional coating process 122 can include further include incorporating a coating material within the graphite-CNF structure. In contrast to the incorporation 128, which provides a polymer constituent or precursor within the graphite-CNF suspension that is then used to build the composite structure at 120, the incorporation of coating 122 involves providing the coating material within the composite structure after the structure has been formed at 120. For example, when the formed composite structure at 120 has pores therein, the coating provided at 122 may act to infiltrate the porous structure (i.e., backfilling), thereby incorporating the coating within the composite structure. As with the external surface coating of 122, the infiltrating coating may be a paint, environmental protection coating, or a polymer coating.

The process 100 can further include configuring the composite structure for a particular application and use in such applications at 124. The configuring can include machining, shaping, working, joining, or any other fabrication or building technique. The composite structures formed from or including the hybrid graphite-CNF materials can be used in a number of applications, such as light-weight high-strength materials for building (e.g., walls, siding, flooring, etc.) or transportation (e.g., body panels, train car walls, fuselage walls, wings), light-weight high-strength packaging (e.g., as a replacement to existing PS packaging), as a replacement for carbon fibers in existing composite structures, as a thermal paste, coating, or structure in a thermal management application, etc. The above list is not intended to be exhaustive. Uses of the graphite-CNF hybrid beyond those specifically listed herein are also possible according to one or more contemplated embodiments. Indeed, one of ordinary skill in the art will readily appreciate that the graphite-CNF can be adapted to other applications based on the teachings of the present disclosure.

As noted above, uncoated graphite-CNF structures may be susceptible to degradation to humidity/water exposure. However, this degradation may optionally be used to recycle formed graphite-CNF structures at 126 in FIG. 1. Indeed, the facile formation and re-formation of hydrogen bonds between the graphite flakes and CNF allow the final structures to be readily returned to the starting material for reuse. In particular, the graphite-CNF composite can be dispersed in solvent (e.g., water) to reconstitute a stable and uniform suspension with the same properties as the original suspension, which reconstituted suspension can then be used at 112 to re-form another composite, for example, via cast drying or any other formation method at 120. In some embodiments, the recycling 126 may include mechanical agitation (e.g., stirring or sonication), in which case further sonication at 114 may be omitted. For those structures protected by a coating, the optional recycling 126 can further include removing the coating (e.g., by dissolving the paint or melting a thermoplastic) before reconstituting the graphite-CNF suspension in the solvent.

In one or more first embodiments, a composite material comprises a plurality of graphite flakes. Each graphite flake has a plurality of fibrils attached to respective surfaces of the graphite flake. The fibrils can be cellulose nanofibers (CNF).

In the first embodiments or any other embodiment, the fibrils can have surface charged groups. In the first embodiments or any other embodiment, the fibrils can have hydrophilic/hydrophobic functional groups. In the first embodiments or any other embodiment, the CNF can have both hydrophilic functional groups and hydrophobic C—H moieties. In the first embodiments or any other embodiment, the CNF can be formed by (2,2,6,6-tetramethylpiperidin-1-yl) oxidanyl (TEMPO) oxidation. In the first embodiments or any other embodiment, each fibril can have a diameter of 5 nm or less. In the first embodiments or any other embodiment, each fibril can have a length of 500-600 nm, inclusive.

In the first embodiments or any other embodiment, interaction between the fibrils and adjacent graphite flakes can form a network of hydrogen bonds. In the first embodiments or any other embodiment, at least some fibrils can be attached to respective surfaces of more than one graphite flake.

In the first embodiments or any other embodiment, each graphite flake can have a planar dimension greater than or equal to 1 µm. In the first embodiments or any other embodiment, the planar dimension of each graphite flake can be greater than or equal to 7.5 µm. In the first embodiments or any other embodiment, the planar dimension of a majority of the graphite flakes can be 11±3.5 µm.

In the first embodiments or any other embodiment, each graphite flake can have a thickness comprised of at least two atomic monolayers. In the first embodiments or any other embodiment, the thickness of each graphite flake can comprise 2-20 atomic monolayers, inclusive. In the first embodiments or any other embodiment, the thickness of each graphite flake can comprise 3-5 atomic monolayers, inclusive.

In the first embodiments or any other embodiment, the composite material can comprise individual layers of graphite flakes arranged adjacent to each other in a plane parallel to a planar dimension of the graphite flakes, and the individual layers can be stacked together in a direction perpendicular to the planar dimension.

In the first embodiments or any other embodiment, pores can be between the graphite flakes. In the first embodiments or any other embodiment, each pore can have a dimension less than 1 µm. In the first embodiments or any other embodiment, the pores can be formed by removing a pore-forming material from the composite material. In the first embodiments or any other embodiment, the pore-forming material can comprise ice.

In the first embodiments or any other embodiment, the composite material can further comprise at least one substrate, mesh, or other structure, onto or into which the plurality of graphite flakes has been provided.

In the first embodiments or any other embodiment, the plurality of graphite flakes can form a hybrid structure with one or more external surfaces. In the first embodiments or any other embodiment, the composite material can further comprise a coating over said external surfaces. In the first embodiments or any other embodiment, the coating can comprise a paint, environmental protection coating, and/or polymer coating.

In the first embodiments or any other embodiment, the plurality of graphite flakes can form a hybrid structure, and the composite material can further comprise a polymer incorporated within the hybrid structure.

In the first embodiments or any other embodiment, the composite material can further comprise a polymer into which the plurality of graphite flakes is incorporated to form a hybrid structure. In the first embodiments or any other embodiment, the polymer can be a thermosetting or thermoplastic polymer.

In the first embodiments or any other embodiment, the composite material can further comprise a solvent in which the plurality of graphite flakes is disposed so as to form a suspension or colloid. In the first embodiments or any other embodiment, the suspension or colloid can form an ink, slurry, paint, or paste. In the first embodiments or any other embodiment, a concentration of the graphite flakes with fibrils in the solvent can be at least 2 wt %. In the first embodiments or any other embodiment, the concentration of the graphite flakes with fibrils in the solvent can be between 2 wt % and 30 wt %, inclusive. In the first embodiments or any other embodiment, a storage modulus (G') at 1 Pa shear stress can be less than or equal to $10^3$ Pa. In the first embodiments or any other embodiment, the solvent can comprise water. In the first embodiments or any other embodiment, the solvent can consist essentially of pure water (i.e., distilled or deionized water).

In the first embodiments or any other embodiment, the composite material can have a specific tensile strength greater than 400 MPa/(g-cm$^{-3}$). In the first embodiments or any other embodiment, the specific tensile strength can be greater than 600 MPa/(g-cm$^{-3}$). In the first embodiments or any other embodiment, the composite material can have a toughness greater than 20 MJ/m$^3$. In the first embodiments or any other embodiment, the toughness can be greater than 25 MJ/m$^3$.

In the first embodiments or any other embodiment, a solid mass ratio of graphite flakes to CNF can be in a range from 2:1 to 1:2. In the first embodiments or any other embodiment, the solid mass ratio can be approximately 1:1.

In the first embodiments or any other embodiment, the composite material can be formed as a one-dimensional, two-dimensional, or three-dimensional structure. In the first embodiments or any other embodiment, the composite material can be formed as a fiber, wire, thread, film, paper, sheet, ribbon, foam, or other three-dimensional structure.

In the first embodiments or any other embodiment, the composite material can be integrated into a one-dimensional, two-dimensional, or three-dimensional structure comprised of a separate material. In the first embodiments or any other embodiment, the structure comprised of the separate material can be formed as a fiber, wire, thread, film, paper, sheet, ribbon, foam, or other three-dimensional structure.

In one or more second embodiments, a method comprises forming a composite material by using a suspension or colloid comprising a plurality of graphite flakes. Each graphite flake has a plurality of fibrils attached to respective surfaces of the graphite flake, and the fibrils are cellulose nanofibers (CNF).

In the second embodiments or any other embodiment, the suspension or colloid can form an ink, slurry, paint, or paste.

In the second embodiments or any other embodiment, the method can further comprise, prior to the forming the composite material, forming the suspension or colloid by combining graphite and CNF in a solvent. In the second embodiments or any other embodiment, in the combining, the graphite can be naturally occurring crystalline graphite without chemical modification.

In the second embodiments or any other embodiment, the fibrils can have surface charged groups. In the second embodiments or any other embodiment, the fibrils can have hydrophilic/hydrophobic functional groups. In the second embodiments or any other embodiment, the CNF can have both hydrophilic functional groups and hydrophobic C—H moieties.

In the second embodiments or any other embodiment, in the combining, each fibril can have a diameter of 5 nm or less. In the second embodiments or any other embodiment, each fibril can have a length of 500-600 nm, inclusive. In the second embodiments or any other embodiment, the method can further comprise performing (2,2,6,6-tetramethylpiperidin-1-yl)oxidanyl (TEMPO) oxidation.

In the second embodiments or any other embodiment, the solvent can comprise water. In the second embodiments or any other embodiment, the solvent can consist essentially of pure water (i.e., distilled or deionized water). In the second embodiments or any other embodiment, the combining can be such that a solid mass ratio of graphite to CNF is in a range from 2:1 to 1:2.

In the second embodiments or any other embodiment, the solid mass ratio can be approximately 1:1.

In the second embodiments or any other embodiment, the combining can comprise sonicating the solvent with graphite and CNF, and the CNF can act as a dispersing agent for exfoliation of the graphite into the graphite flakes.

In the second embodiments or any other embodiment, the forming the suspension or colloid can comprise, after the combining, evaporating at least some of the solvent such that a concentration of the graphite flakes with CNF in remaining solvent is at least 2 wt %. In the second embodiments or any other embodiment, the concentration of the graphite flakes with CNF in the solvent can be between 2 wt % and 30 wt %, inclusive.

In the second embodiments or any other embodiment, after the forming the suspension or colloid, each graphite flake can have a planar dimension greater than or equal to 1 µm. In the second embodiments or any other embodiment, the planar dimension of each graphite flake can be greater than or equal to 7.5 µm. In the second embodiments or any other embodiment, the planar dimension of a majority of the graphite flakes can be 11±3.5 µm.

In the second embodiments or any other embodiment, after the forming the suspension or colloid, each graphite flake can have a thickness comprised of at least two atomic monolayers. In the second embodiments or any other embodiment, the thickness of each graphite flake can comprise 2-20 atomic monolayers, inclusive. In the second embodiments or any other embodiment, the thickness of each graphite flake can comprise 3-5 atomic monolayers, inclusive.

In the second embodiments or any other embodiment, the forming the suspension or colloid can be performed at room temperature. In the second embodiments or any other embodiment, the forming the suspension or colloid can be performed at a temperature less than or equal to 30° C. In the second embodiments or any other embodiment, the forming the suspension or colloid can be performed without any supplemental heating or cooling.

In the second embodiments or any other embodiment, the forming the composite material can comprise applying the suspension or colloid, and drying the applied suspension or colloid. In the second embodiments or any other embodiment, the applying the suspension or colloid can comprise at least one of spraying, slurry coating, brush coating, blade coating, pouring, extruding, and three-dimensional printing. In the second embodiments or any other embodiment, the drying can comprise at least one of cast drying, vacuum-assisted drying, and freeze-drying.

In the second embodiments or any other embodiment, the suspension or colloid can include a separate polymer. In the second embodiments or any other embodiment, the polymer can comprise a thermoplastic or thermosetting polymer.

In the second embodiments or any other embodiment, the forming the composite material can comprise combining the suspension or colloid with a constituent or precursor. In the second embodiments or any other embodiment, the forming the composite material can comprise forming a hybrid structure from the mixture, where the graphite flakes with CNF act as a filler in a structural material formed by the constituent or precursor. In the second embodiments or any other embodiment, the structural material can be formed by the constituent or precursor comprises a thermoplastic or thermosetting polymer.

In the second embodiments or any other embodiment, the applying the suspension or colloid can comprise forming one or more layers from the suspension or colloid on or in a substrate, mesh, or other structure. In the second embodiments or any other embodiment, the forming the composite material can further comprise drying the suspension or colloid to completely remove the solvent therefrom, thereby forming the composite material. In the second embodiments or any other embodiment, the forming the composite material can comprise, after the drying, removing the composite material from the substrate, mesh, or other structure.

In the second embodiments or any other embodiment, the forming the composite material can comprise providing a first layer of the suspension or colloid, and partially drying the first layer. In the second embodiments or any other embodiment, the forming the composite material can comprise providing a second layer of the suspension or colloid over the first layer and partially drying the second layer. In the second embodiments or any other embodiment, the forming the composite material can comprise pressing the first and second layers together, and further drying the pressed layers to form the composite material. In the second embodiments or any other embodiment, the pressing and the further drying can be performed at the same time and can comprise hot pressing.

In the second embodiments or any other embodiment, the forming the composite material can comprise extruding the suspension or colloid via a printhead. In the second embodiments or any other embodiment, the extruding can be into a second solvent different from a first solvent of the suspension or colloid, the second solvent can replace the first solvent, and the forming the composite material can further comprise evaporating the second solvent to form the composite material of the graphite flakes and fibrils. In the second embodiments or any other embodiment, a storage modulus (G') at 1 Pa shear stress can be less than or equal to $10^3$ Pa.

In the second embodiments or any other embodiment, the forming the composite material can comprise providing a preliminary structure formed by the suspension or colloid, cooling the preliminary structure such that a first solvent of the suspension or colloid freezes, and freeze-drying the preliminary structure such that the frozen first solvent sublimes, thereby forming the composite material with pores between the graphite flakes. In the second embodiments or any other embodiment, the pores can have a dimension less than 1 μm.

In the second embodiments or any other embodiment, the forming the composite material can comprise incorporating a pore-forming material in the suspension or colloid, providing a preliminary structure formed by the suspension or colloid after the incorporating, drying the preliminary structure to remove a first solvent of the suspension or colloid, and after the drying, removing the pore-forming material, thereby forming the composite material with pores between the graphite flakes. In the second embodiments or any other embodiment, the removing can comprise dissolving the pore-forming material in a second solvent. In the second embodiments or any other embodiment, the pore-forming material can be a salt, a sugar, or any other material dissolvable in a solvent that does not substantially degrade the composite structure including graphite-CNF.

In the second embodiments or any other embodiment, the forming the composite material can be such that a network of hydrogen bonds is formed between the fibrils and adjacent graphite flakes. In the second embodiments or any other embodiment, at least some fibrils can be attached to respective surfaces of more than one graphite flake.

In the second embodiments or any other embodiment, the method can further comprise coating an external surface of the composite material with a paint, environmental protection coating, and/or polymer coating.

In the second embodiments or any other embodiment, the forming the composite material can comprise incorporating a polymer within a structure formed by the plurality of graphite flakes. In the second embodiments or any other embodiment, the forming the composite material can comprise incorporating the plurality of graphite flakes as a filler in a polymer. In the second embodiments or any other embodiment, the polymer can comprise a thermosetting or thermoplastic polymer.

In the second embodiments or any other embodiment, the method can further comprise, after the forming, dissolving the composite material in a solvent to reconstitute the suspension or colloid. In the second embodiments or any other embodiment, the method can further comprise, after the forming, dissolving the composite material in a solvent. In the second embodiments or any other embodiment, the method can further comprise, after the forming, removing a surface coating from the composite material and then dissolving the remaining composite material. In the second embodiments or any other embodiment, the method can further comprise, after the forming, dissolving the composite material by exposure to the environment.

In the second embodiments or any other embodiment, the composite material can be formed as a one-dimensional, two-dimensional, or three-dimensional structure. In the second embodiments or any other embodiment, the composite material can be formed as a fiber, wire, thread, film, paper, sheet, ribbon, foam, or other three-dimensional structure.

In the second embodiments or any other embodiment, the composite material can be integrated into a one-dimensional, two-dimensional, or three-dimensional structure comprised of a separate material. In the second embodiments or any other embodiment, the structure can be comprised of the separate material is formed as a fiber, wire, thread, film, paper, sheet, ribbon, foam, or other three-dimensional structure.

In one or more third embodiments, a colloid or suspension comprises a plurality of graphite flakes and a solvent. Each graphite flake has a plurality of fibrils attached to respective surfaces of the graphite flake. The plurality of graphite flakes is disposed in the solvent. The fibrils are cellulose nanofibers (CNF) and act as a dispersing agent with respect to the graphite flakes in the solvent.

In the third embodiments or any other embodiment, the colloid or suspension can form an ink, slurry, paint, or paste.

In the third embodiments or any other embodiment, the CNF can be formed by (2,2,6,6-tetramethylpiperidin-1-yl) oxidanyl (TEMPO) oxidation. In the third embodiments or any other embodiment, each fibril can have a diameter of 5 nm or less. In the third embodiments or any other embodiment, each fibril can have a length of 500-600 nm, inclusive.

In the third embodiments or any other embodiment, the fibrils can have surface charged groups. In the third embodiments or any other embodiment, the fibrils can have hydrophilic/hydrophobic functional groups. In the third embodiments or any other embodiment, the CNF can have both hydrophilic functional groups and hydrophobic C—H moieties.

In the third embodiments or any other embodiment, each graphite flake can have a planar dimension greater than or equal to 1 μm. In the third embodiments or any other embodiment, the planar dimension of each graphite flake can be greater than or equal to 7.5 μm. In the third embodiments or any other embodiment, the planar dimension of a majority of the graphite flakes can be 11±3.5 μm. In the third embodiments or any other embodiment, each graphite flake can have a thickness comprised of at least two atomic monolayers. In the third embodiments or any other embodiment, the thickness of each graphite flake can comprise 2-20 atomic monolayers, inclusive. In the third embodiments or any other embodiment, each graphite flake can comprise 3-5 atomic monolayers, inclusive.

In the third embodiments or any other embodiment, a concentration of the graphite flakes with fibrils in the solvent can be at least 2 wt %. In the third embodiments or any other embodiment, the concentration of the graphite flakes with fibrils in the solvent can be between 2 wt % and 30 wt %, inclusive.

In the third embodiments or any other embodiment, the solvent can comprise water. In the third embodiments or any other embodiment, the solvent can consist essentially of pure water.

In the third embodiments or any other embodiment, a solid mass ratio of graphite flakes to CNF can be in a range from 2:1 to 1:2. In the third embodiments or any other embodiment, the solid mass ratio can be approximately 1:1.

In the third embodiments or any other embodiment, the colloid or suspension can further comprise at least one of a constituent or precursor material for forming a polymer (e.g., polyurea or polyvinyl alcohol), a stabilizer (e.g., benzene phosphonous acid compounds), and nanoparticles (e.g., gold or iron).

In one or more fourth embodiments, a method comprises forming the colloid or suspension of the third embodiments or any other embodiment.

In the fourth embodiments or any other embodiment, the forming can comprise combining graphite and CNF in the solvent. In the fourth embodiments or any other embodiment, in the combining, the graphite can be naturally occurring crystalline graphite without chemical modification. In the fourth embodiments or any other embodiment, the combining can comprise sonicating the solvent with graphite and CNF, and the CNF can act as a dispersing agent for exfoliation of the graphite into the graphite flakes.

In the fourth embodiments or any other embodiment, the forming can comprise evaporating at least some of the solvent such that a concentration of the graphite flakes with CNF in the remaining solvent is between 2 wt % and 30 wt %, inclusive.

In the fourth embodiments or any other embodiment, the forming can be performed at a temperature less than or equal to 30° C. In the fourth embodiments or any other embodiment, the forming can be performed at room temperature. In the fourth embodiments or any other embodiment, the forming can be performed without any supplemental heating or cooling.

In the fourth embodiments or any other embodiment, the method can further comprise, after the forming, storing the colloid or suspension in a container, and, after the storing, forming a composite material using the colloid or suspension. In the fourth embodiments or any other embodiment, the storing can be such that there is no discernible sedimentation of the graphite flakes after at least one month. In the fourth embodiments or any other embodiment, the storing can be such that there is no discernible sedimentation of the graphite flakes after at least three months. In the fourth embodiments or any other embodiment, the storing can be such that there is no discernible sedimentation of the graphite flakes after at least six months. In the fourth embodiments or any other embodiment, the storing can be such that there is no discernible sedimentation of the graphite flakes after at least twelve months. In the fourth embodiments or any other embodiment, the storing can be such that there is no discernible sedimentation of the graphite flakes after at least thirty-six months.

In the fourth embodiments or any other embodiment, the forming the suspension can comprise dissolving a previously-formed composite material in the solvent. In the fourth embodiments or any other embodiment, the forming the suspension can comprise removing a surface coating from a previously-formed composite material and then dissolving the remaining composite material in the solvent.

In this application, unless specifically stated otherwise, the use of the singular includes the plural, and the separate use of "or" and "and" includes the other, i.e., "and/or." Furthermore, use of the terms "including" or "having," as well as other forms such as "includes," "included," "has," or "had," are intended to have the same effect as "comprising" and thus should not be understood as limiting.

Any range described herein will be understood to include the endpoints and all values between the endpoints. Whenever "substantially," "approximately," "essentially," "near," or similar language is used in combination with a specific value, variations up to and including 10% of that value are intended, unless explicitly stated otherwise.

The foregoing descriptions apply, in some cases, to examples generated in a laboratory, but these examples can be extended to production techniques. Thus, where quantities and techniques apply to the laboratory examples, they should not be understood as limiting.

It is thus apparent that there is provided, in accordance with the present disclosure, graphite materials and methods for fabricating and use thereof. Many alternatives, modifications, and variations are enabled by the present disclosure. While specific examples have been shown and described in detail to illustrate the application of the principles of the present invention, it will be understood that the invention may be embodied otherwise without departing from such principles. For example, disclosed features may be combined, rearranged, omitted, etc. to produce additional embodiments, while certain disclosed features may sometimes be used to advantage without a corresponding use of other features. Accordingly, Applicant intends to embrace all such alternative, modifications, equivalents, and variations that are within the spirit and scope of the present invention.

The invention claimed is:

1. A method comprising:
forming a suspension or colloid by combining graphite and cellulose nanofibers in a solvent; and
after the forming the suspension or colloid, forming a composite material from the suspension or colloid,
wherein the suspension or colloid comprises a plurality of graphite flakes, each graphite flake has a plurality of fibrils attached to respective surfaces of the graphite flake, and the fibrils are the cellulose nanofibers, and
wherein the forming the composite material comprises:
providing a preliminary structure formed by the suspension or colloid;
cooling the preliminary structure such that a first solvent of the suspension or colloid freezes; and
freeze-drying the preliminary structure such that the frozen first solvent sublimes, thereby forming the composite material with pores between the graphite flakes.

2. A method comprising:
performing (2,2,6,6-tetramethylpiperidin-1-yl)oxidanyl (TEMPO) oxidation of cellulose nanofibers;
after the TEMPO oxidation, forming a suspension or colloid by combining graphite and the cellulose nanofibers in a solvent; and
after the forming the suspension or colloid, forming a composite material from the suspension or colloid, which comprises a plurality of graphite flakes,
wherein each graphite flake has a plurality of fibrils attached to respective surfaces of the graphite flake, and the fibrils are the cellulose nanofibers, and
wherein the forming the composite material comprises:
providing a first layer of the suspension or colloid;
partially drying the first layer;
providing a second layer of the suspension or colloid over the first layer;
partially drying the second layer;
pressing the first and second layers together; and
further drying the pressed layers to form the composite material.

3. The method of claim 2, wherein the pressing and the further drying are performed at the same time and comprise hot pressing.

4. A method comprising:
performing (2,2,6,6-tetramethylpiperidin-1-yl)oxidanyl (TEMPO) oxidation of cellulose nanofibers;
after the TEMPO oxidation, forming a suspension or colloid by combining graphite and the cellulose nanofibers in a solvent; and
after the forming the suspension or colloid, forming a composite material from the suspension or colloid, which comprises a plurality of graphite flakes,
wherein each graphite flake has a plurality of fibrils attached to respective surfaces of the graphite flake, and the fibrils are the cellulose nanofibers, and
after the forming the suspension or colloid, each graphite flake has a planar dimension greater than or equal to 7.5 µm.

5. The method of claim 4, wherein the combining comprises sonicating the solvent with the graphite and the cellulose nanofibers, and the cellulose nanofibers acts as a dispersing agent for exfoliation of the graphite into the graphite flakes.

6. The method of claim 4, wherein:
the forming the composite material comprises applying the suspension or colloid, and drying the applied suspension or colloid,
the applying the suspension or colloid comprises spraying, slurry coating, brush coating, blade coating, pouring, extruding, three-dimensional printing, or any combination thereof, and
the drying comprises cast drying, vacuum-assisted drying, freeze-drying, or any combination thereof.

7. The method of claim 6, wherein the forming the composite material comprises:
incorporating a pore-forming material in the suspension or colloid;
providing a preliminary structure formed by the suspension or colloid after the incorporating;
drying the preliminary structure to remove a first solvent of the suspension or colloid; and
after the drying, removing the pore-forming material, thereby forming the composite material with pores between the graphite flakes.

8. The method of claim 4, wherein:
the forming the composite material comprises applying the suspension or colloid, and drying the applied suspension or colloid, and
the applying the suspension or colloid comprises forming one or more layers from the suspension or colloid on or in a substrate, mesh, or other structure.

9. The method of claim 4, wherein, in the combining, the graphite is naturally occurring crystalline graphite without chemical modification.

10. The method of claim 4, wherein, in the combining, each fibril has a diameter of 5 nm or less and a length of 500-600 nm, inclusive.

11. The method of claim 4, wherein the combining is such that a solid mass ratio of the graphite to the cellulose nanofibers is in a range from 2:1 to 1:2.

12. The method of claim 4, wherein the forming the suspension or colloid comprises, after the combining, evaporating at least some of the solvent such that a concentration of the graphite flakes with the cellulose nanofibers in remaining solvent is at least 2 wt %.

13. The method of claim 4, wherein the forming the composite material comprises:
combining the suspension or colloid with a constituent or precursor; and
forming a hybrid structure from the combination, where the graphite flakes with the cellulose nanofibers act as a filler in a structural material formed by the constituent or precursor.

14. The method of claim 4, wherein:
the forming the composite material comprises applying the suspension or colloid, and drying the applied suspension or colloid;
the applying the suspension or colloid comprises forming one or more layers from the suspension or colloid on or in a substrate, mesh, or other structure; and
the forming the composite material further comprises:
drying the suspension or colloid to completely remove the solvent therefrom, thereby forming the composite material; and
after the drying, removing the composite material from the substrate, mesh, or other structure.

15. The method of claim 4, wherein:
- the forming the composite material comprises extruding the suspension or colloid via a printhead;
- the extruding is into a second solvent different from a first solvent of the suspension or colloid, the second solvent replacing the first solvent; and
- the forming the composite material further comprises evaporating the second solvent to form the composite material of the graphite flakes and fibrils.

16. The method of claim 4, wherein the forming the composite material comprises:
- incorporating a polymer within a structure formed by the plurality of graphite flakes; or
- incorporating the plurality of graphite flakes as a filler in a polymer.

\* \* \* \* \*